(12) United States Patent
Zhang et al.

(10) Patent No.: US 11,218,249 B2
(45) Date of Patent: Jan. 4, 2022

(54) APPARATUS, SYSTEM AND METHOD OF PROCESSING A WIRELESS COMMUNICATION PACKET BASED ON A CYCLIC REDUNDANCY CHECK (CRC) RESULT

(71) Applicant: INTEL CORPORATION, Santa Clara, CA (US)

(72) Inventors: Yuwei Zhang, Pleasanton, CA (US); Prasanna Desai, Elfin Forest, CA (US)

(73) Assignee: INTEL CORPORATION, Santa Clara, CA (US)

(*) Notice: Subject to any disclaimer, the term of this patent is extended or adjusted under 35 U.S.C. 154(b) by 16 days.

(21) Appl. No.: 16/574,449

(22) Filed: Sep. 18, 2019

(65) Prior Publication Data

US 2020/0014489 A1 Jan. 9, 2020

(51) Int. Cl.
| | |
|---|---|
| H04L 1/00 | (2006.01) |
| H04L 29/08 | (2006.01) |
| H04B 1/707 | (2011.01) |
| H04L 12/26 | (2006.01) |
| H04L 5/00 | (2006.01) |
| H04L 1/20 | (2006.01) |
| H04W 84/18 | (2009.01) |
| H04W 4/80 | (2018.01) |

(52) U.S. Cl.
CPC ........... H04L 1/0061 (2013.01); H04B 1/707 (2013.01); H04L 5/0055 (2013.01); H04L 43/18 (2013.01); H04L 69/324 (2013.01); H04L 1/203 (2013.01); H04W 4/80 (2018.02); H04W 84/18 (2013.01)

(58) Field of Classification Search
CPC ..... H04L 1/0061; H04L 5/0055; H04L 43/18; H04L 69/324; H04L 1/203; H04B 1/707; H04W 4/80; H04W 84/18
USPC .................................................. 370/241, 252
See application file for complete search history.

(56) References Cited

U.S. PATENT DOCUMENTS

| | | | | |
|---|---|---|---|---|
| 9,065,594 B1* | 6/2015 | Husted | ................ | H04L 1/0002 |
| 10,574,393 B1* | 2/2020 | Ganwani | ............... | H04L 1/0041 |
| 2005/0235192 A1* | 10/2005 | Bernadac | .............. | H04L 1/0066 |
| | | | | 714/781 |
| 2008/0002618 A1* | 1/2008 | Murata | ................ | H04L 1/0027 |
| | | | | 370/329 |
| 2012/0324317 A1* | 12/2012 | Sripathi | ............... | H04L 1/0054 |
| | | | | 714/795 |

OTHER PUBLICATIONS

Bluetooth Core Specification V 5.0, Dec. 6, 2016, 2822 pages.
(Continued)

*Primary Examiner* — Obaidul Huq
(74) *Attorney, Agent, or Firm* — Shichrur & Co.

(57) ABSTRACT

For example, a wireless communication device may be configured to determine a count of one or more unreliable data symbols in a received wireless communication packet having a valid Cyclic Redundancy Check (CRC) result; based on the count of the unreliable data symbols, to determine whether to classify the valid CRC result as a false-positive CRC result; and, based on classification of the valid CRC result as a false-positive CRC result, to handle the received wireless communication packet as having a non-valid CRC result.

23 Claims, 7 Drawing Sheets

(56) References Cited

OTHER PUBLICATIONS

IEEE P802.15.4REVb/D6, Apr. 2006, Draft Revision for IEEE Standard for Information technology—Telecommunications and information exchange between systems—Local and metropolitan area networks—Specific equirements—Part 15.4b: Wireless Medium Access Control (MAC) and Physical Layer (PHY) Specifications for Low Rate Wireless Personal Area Networks (WPANs), Apr. 2006, 317 pages.

IEEE Std 802.11 ™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

\* cited by examiner

400

APPARATUS, SYSTEM AND METHOD OF PROCESSING A WIRELESS COMMUNICATION PACKET BASED ON A CYCLIC REDUNDANCY CHECK (CRC) RESULT

TECHNICAL FIELD

Embodiments described herein generally relate to processing a wireless communication packet based on a Cyclic Redundancy Check (CRC) result.

BACKGROUND

A wireless communication device may use a Cyclic Redundancy Check (CRC) error-detection code to detect errors in a received wireless communication packet.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
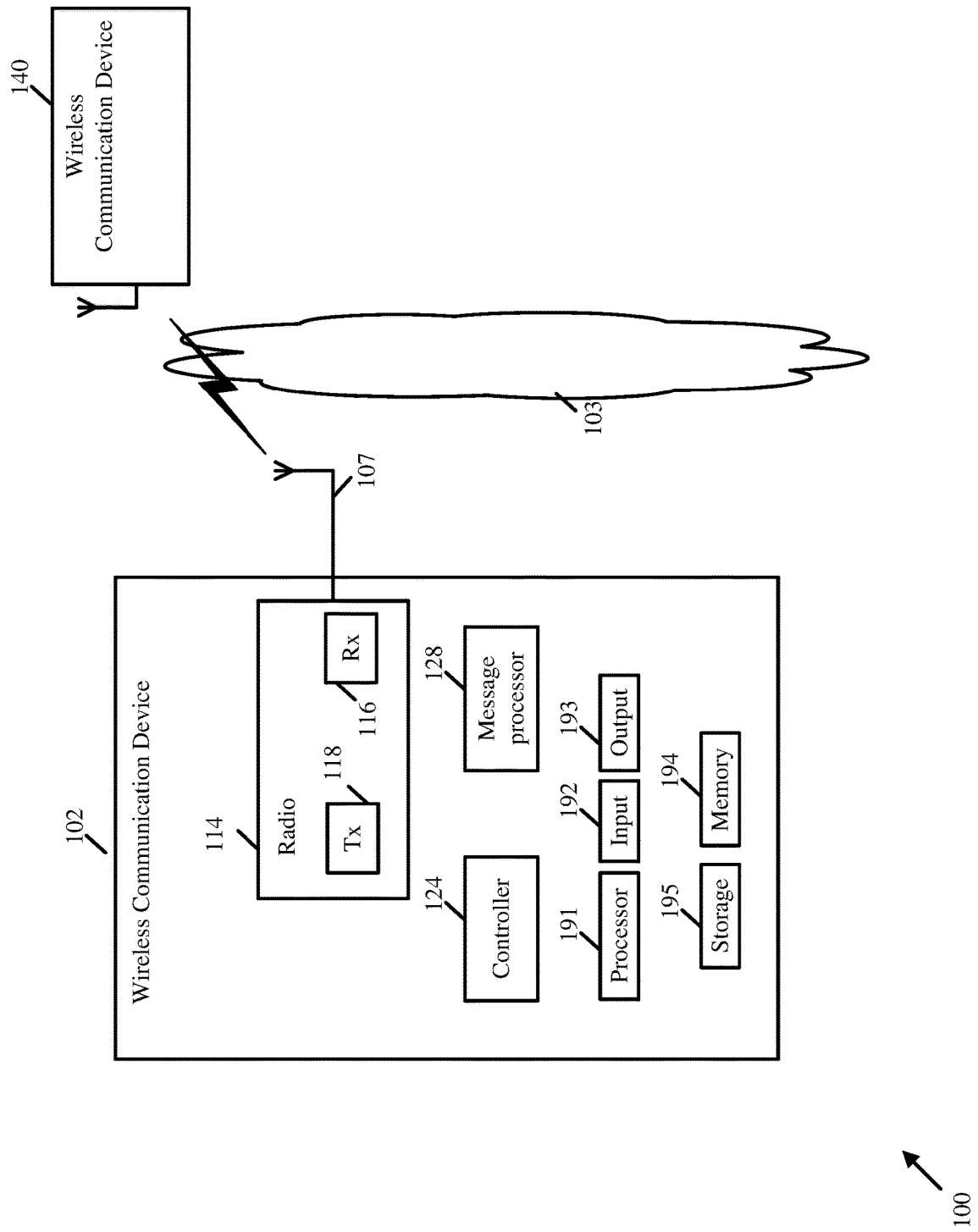
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Bluetooth device, a Bluetooth Low Energy (BLE) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth standards"), e.g., including *Bluetooth Core Specification V* 5.0, Dec. 6, 2016, and/or future versions and/or derivatives thereof, devices and/or networks operating in accordance with existing IEEE 802.15 standards (including *IEEE 802.15.4-2006 (IEEE P802.15.4REVb/D6*, Apr., 2006, *Draft Revision for IEEE Standard for Information technology—Telecommunications and information exchange between systems—Local and metropolitan area networks—Specific requirements—Part 15.4b: Wireless Medium Access Control (MAC) and Physical Layer (PHY) Specifications for Low Rate Wireless Personal Area Networks (WPANs)*, Apr., 2006)) and/or future versions and/or derivatives thereof, devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016)) and/or future versions and/or derivatives thereof, devices and/or networks operating in accordance with existing WFA Peer-to-Peer (P2P) specifications (*WiFi P2P technical specification, version* 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to BT communication, e.g., according to a BT protocol and/or a BLE protocol. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., a wireless communication device 102, and/or at least one wireless communication device 140.

In some demonstrative embodiments, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more BT devices.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of, any other devices and/or STAs.

In some demonstrative embodiments, device 102 may include a STA or an access point (AP) STA and/or device 140 may include an STA or an AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a BT channel, a BLE channel, a channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102, and/or 140 may include or perform one or more functionalities of BT devices.

In some demonstrative embodiments, devices 102 and/or 140 may include one or more radios including circuitry and/or logic to perform wireless communication between devices 102, 140 and/or one or more other devices. For example, device 102 may include at least one radio 114, e.g., including a BT radio and/or a WLAN radio.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, Radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may be configured to communicate over a 2.4 GHz band and/or any other band.

In some demonstrative embodiments, radio 114 may include, or may be associated with, one or more antennas.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include, operate as, perform the role of, and/or perform one or more functionalities of, one or more STAs.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In some demonstrative embodiments, wireless communication devices 102 and/or 140 may form, or may communicate as part of, a BT network.

In other embodiments, device 102 and/or device 140 may form, and/or communicate as part of, any other additional or alternative network.

In some demonstrative embodiments, device 102 may be configured to receive wireless communication packets from device 140, e.g., as described below.

In some demonstrative embodiments, device 102 may be configured to employ a Cyclic Redundancy Check (CRC) error detection code (also referred to as a "Frame Check Sequence (FCS)"), for example, to detect errors in the wireless communication packets from device 140.

In one example, the CRC error detection code may be implemented, for example, in accordance with a wireless communication standard including a MAC layer protocol, which employs the CRC error-detection.

In some demonstrative embodiments, in some use cases, deployments and/or scenarios, the CRC error detection code may have one or more deficiencies or disadvantages, for example, in case of a false-positive CRC result, for example, if a CRC check indicates a valid CRC result, while the packet is actually corrupt, e.g., as described below.

In some demonstrative embodiments, in some use-cases and/or implementations, the CRC error detection code may have a high probability of false-positive CRC results, e.g., as described below.

In some demonstrative embodiments, there may be one or more disadvantages in a CRC code implemented by a classic Bluetooth Standard and/or an IEEE standard, e.g., an *IEEE 802.15.4 (2006) standard*, for example, when using a 16-bit FCS, e.g., as such CRC code may have a high probability of false-positive CRC results.

In one example, a 16-bit FCS, which may be used by a MAC layer, for example, in accordance with the Classic Bluetooth Standard and/or the *IEEE 802.15.4 (2006) standard*, e.g., as used by Zigbee Pro Technology and Thread Technology, may have one or more disadvantages. For example, a plurality of corrupt packet payloads may result in a valid FCS. This "false positive" result may cause the corrupted frames to pass undetected to upper layers, which may reduce performance of the upper layers.

For example, a polynomial of a CRC generator may not be adequate to eliminate a large number of false-positives, e.g., because several combinations of corrupted payloads may be mapped to valid CRC codewords.

In another example, wireless systems having multiple modulation modes may have one or more disadvantages. For example, the wireless systems may employ adaptive modulation modes, e.g., based on the channel condition, for example, to maximize a system throughput. However, in some use cases, deployments and/or scenarios, the adaptive modulation modes may not be efficient with respect to system link quality control.

In some demonstrative embodiments, the large number of false-positive CRC results may be alleviated, for example, by using a 32-bit FCS, e.g., in accordance with a BLE standard and/or future versions of the *IEEE 802.15.4 (2006) standard*. However, the classic Bluetooth Standard and/or the *IEEE 802.15.4 (2006) standard* remain widely deployed, e.g., for interoperability reasons with an existing installed base of Bluetooth and/or IEEE 802.15.4 compatible devices, and/or for reasons of global regulatory availability of the 2.4 GHz Industrial, Scientific and Medical (ISM) spectrum versus other versions, which do not use the 2.4 GHz band.

In some demonstrative embodiments, provisioning for an additional upper layer Logical Link Control and Adaptation Layer Protocol (L2CAP) error detection mechanism and/or extending a CRC length in subsequent versions of the Classic Bluetooth Standard, e.g., the BLE specification, may not provide a solution to devices implementing the Classic Bluetooth Standard, which may be widely deployed.

Figure 2:
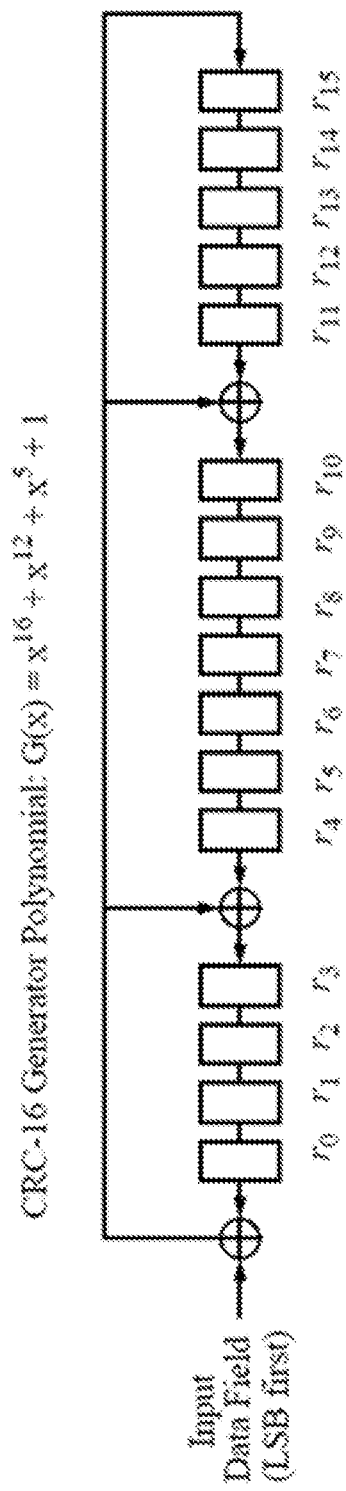
FIG. 2 is a schematic illustration of a 16-bit Cyclic Redundancy Check (CRC) encoder, in accordance with some demonstrative embodiments.

Reference is made to FIG. 2, which schematically illustrates a 16-bit CRC encoder 200, which may be implemented in accordance with some demonstrative embodiments.

For example, a minimum Hamming distance of the 16-bit CRC Encoder 200 may be 4, which may enable to detect error patterns having errors, which may be less than 4 bits.

In one example, all odd number errors may always be detected based on the 16-bit CRC Encoder 200, for example, since the Hamming weight of CRC codewords generated by 16-bits CRC Encoder 200 is always an even number.

In some demonstrative embodiments, a probability of a CRC false detection may be determined, for example, based on a packet payload bit-length, denoted "L", and a channel Bit-Error-Rate (BER), denoted "E", e.g., as described below.

In some demonstrative embodiments, a probability of a packet having an error may be determined, e.g., as follows:

$$P_c = 1 - (1-\epsilon)^L \tag{1}$$

In some demonstrative embodiments, a probability of a packet having more than 3 errors may be determined, e.g., as follows:

$$P_{3e} = 1 - (1-\epsilon)^L - C_L^1 \epsilon (1-\epsilon)^{L-1} - C_L^2 \epsilon^2 (1-\epsilon)^{L-2} - C_L^3 \epsilon^3 (1-\epsilon)^{L-3} \tag{2}$$

In some demonstrative embodiments, a probability of a packet having 4 errors may be determined, e.g., as follows:

$$P_{4e} = C_L^4 \epsilon^4 (1-\epsilon)^{L-4} \tag{3}$$

In some demonstrative embodiments, a 16-bit CRC parity check may have $2^{16}$ different possible values, e.g., where only an all-zeros checking result means error-free. Therefore, a probability of an error pattern getting an all-zeros checking result may be $2^{-16}$.

In some demonstrative embodiments, a probability of a CRC false detection may be determined, e.g., as follows:

$$P_{det}=P_{3e}*2^{-16} \qquad (4)$$

In some demonstrative embodiments, a probability of a CRC false detection caused by a 4-bit error may be determined, e.g., as follows:

$$P_{det-4}=P_{4e}*2^{-16} \qquad (5)$$

Figure 3:
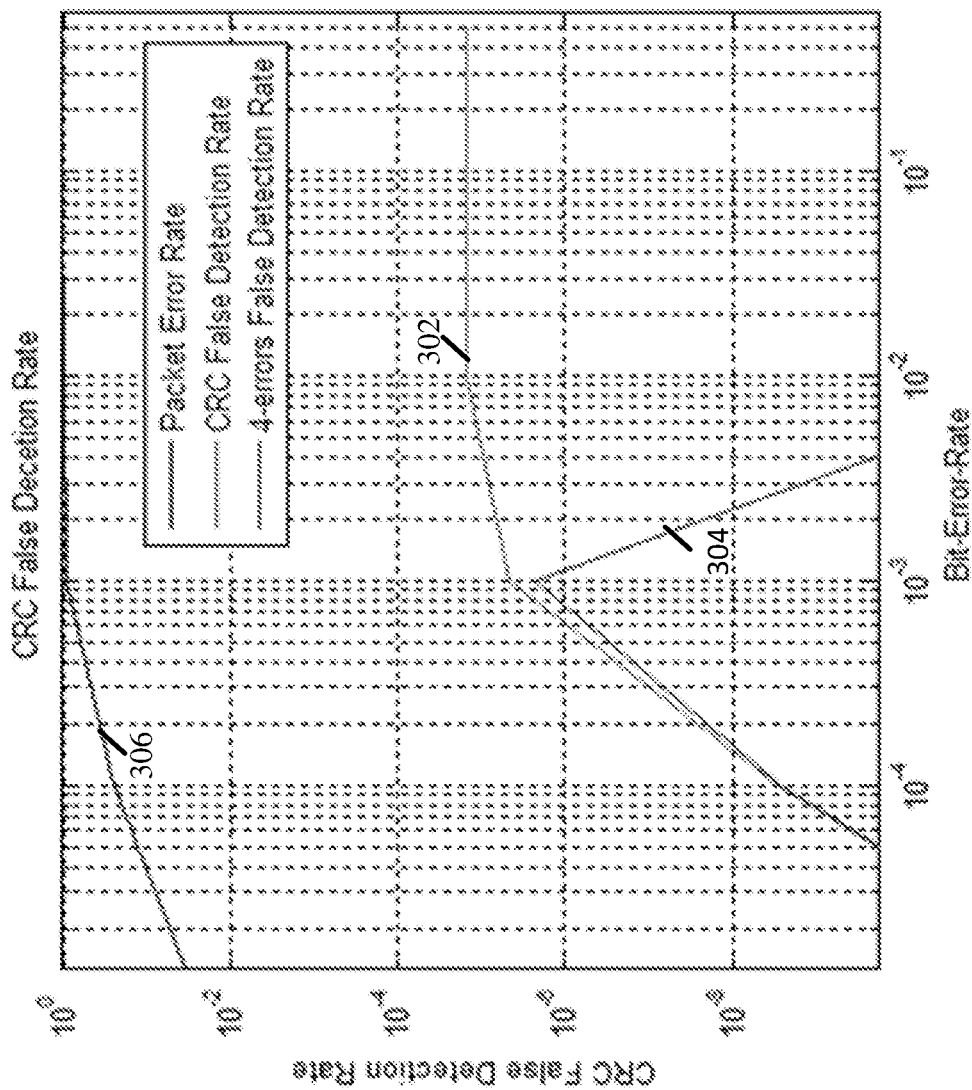
FIG. 3 is a schematic illustration of a graph depicting a CRC false detection rate versus a Bit Error Rate (BER) of a wireless communication channel, in accordance with some demonstrative embodiments.

Reference is made to FIG. 3, which schematically illustrates a graph 300 depicting a CRC false detection rate versus a BER of a wireless communication channel, in accordance with some demonstrative embodiments.

In some demonstrative embodiments, graph 300 shows a CRC false detection rate 302 for a packet having a 434-byte payload.

In some demonstrative embodiments, as shown in graph 300, when the BER is low, e.g., a PER 306 is low, the CRC false detection rate 302 may be dominated for example, by error patterns having only 4-bit errors 304, e.g., since the probability of more than 4-bit errors is low.

In some demonstrative embodiments, as shown in graph 300, when the BER is high, e.g., the PER 306 is high, the CRC false detection rate 302 may be dominated, for example, by error patterns having more than 4-bit errors, e.g., since the probability of only 4-bit errors is low.

In some demonstrative embodiments, for a bad channel condition, e.g., when the BER is high, the CRC false detection rate 302 may be reduced significantly, for example, by detecting error patterns having 6-bits or more errors, e.g., since 5-bit errors may always be detected.

In some demonstrative embodiments, for a good channel condition, e.g., when the BER is low, blocking some packets with 4-bit error patterns, may reduce the CRC false detection rate 302. However, some error-free packets may be blocked.

Referring back to FIG. 1, in some demonstrative embodiments, device 102 may be configured to implement an error detection mechanism, for example, based on channel conditions of a wireless communication channel, e.g., as described below.

In some demonstrative embodiments, device 102 may be configured to count a number of unreliable data symbols in a received data packet, e.g., as described below.

In some demonstrative embodiments, device 102 may be configured to detect unreliable symbols, and to make decisions, based on the channel conditions, e.g., as described below.

In some demonstrative embodiments, device 102 may be configured to reduce an impact of false detections, e.g., false-positive results, using the error detection mechanism, for example, in the classic Bluetooth Standard and the *IEEE 802.15.4 (2006) standard*, for example, when using a 16-bit CRC, e.g., as described below.

In some demonstrative embodiments, device 102 may be configured to estimate a channel condition, for example, for link quality estimation, e.g., as described below.

In some demonstrative embodiments, device 102 may be configured to detect the unreliable data symbols, and a total count of the unreliable data symbols, which may be used as a reliability indicator for the received data packet, for example, by implementing one or more algorithms. As a result, based on the reliability indicator, the received data packet may be discarded, and thereby warranting a re-transmission, which may protect upper layers from receiving corrupted packets, e.g., as described below.

In some demonstrative embodiments, controller 124 may be configured to control, trigger and/or cause device 102 to determine a count of one or more unreliable data symbols in a received wireless communication packet having a valid CRC result, e.g., as described below.

In some demonstrative embodiments, controller 124 may be configured to control, trigger and/or cause device 102, radio 114, and/or receiver 116 to receive the wireless communication packet, e.g., from device 140.

In some demonstrative embodiments, controller 124 may be configured to control, trigger and/or cause device 102 to, based on the count of the unreliable data symbols, determine whether to classify the valid CRC result as a false-positive CRC result, e.g., as described below.

In some demonstrative embodiments, controller 124 may be configured to control, trigger and/or cause device 102 to, based on classification of the valid CRC result as a false-positive CRC result, select how to handle the received wireless communication packet as having a non-valid CRC result, e.g., as described below.

In some demonstrative embodiments, controller 124 may be configured to control, trigger and/or cause device 102 to, based on the classification of the valid CRC result as a false-positive CRC result, select to discard the received wireless communication packet, e.g., as described below.

In some demonstrative embodiments, controller 124 may be configured to control, trigger and/or cause device 102 to, based on the classification of the valid CRC result as a false-positive CRC result, transmit a Negative Acknowledgement (NACK) to indicate to a transmitter of the received wireless communication packet, e.g., device 140, that the received wireless communication packet is not successfully received, e.g., as described below.

In some demonstrative embodiments, the received wireless communication packet may include a Low-Rate Wireless Personal Area Networks (LR-WPAN) packet, e.g., as described below.

In some demonstrative embodiments, the received wireless communication packet may include a Bluetooth (BT) packet, e.g., as described below.

In other embodiments, the received wireless communication packet may include any other type of packet.

In some demonstrative embodiments, the valid CRC result may be based on a 16-bit CRC code, e.g., as described below.

In some demonstrative embodiments, the valid CRC result may be based on any other CRC code of any other length, e.g., as described below.

In some demonstrative embodiments, controller 124 may be configured to control, trigger and/or cause device 102 to determine whether to classify the valid CRC result as the false-positive CRC result, for example, based on an estimated noise condition of a wireless communication channel for receiving the received wireless communication packet, e.g., as described below.

In some demonstrative embodiments, controller 124 may be configured to control, trigger and/or cause device 102 to determine the estimated noise condition, for example, based on a plurality of unreliable count values corresponding to a respective plurality of received wireless communication packets, e.g., as described below.

In some demonstrative embodiments, controller 124 may be configured to control, trigger and/or cause device 102 to determine whether to classify the valid CRC result as the false-positive CRC result, for example, based on a comparison between the count of unreliable data symbols and a count threshold, and based on a comparison between the estimated noise condition and a noise threshold, e.g., as described below.

In some demonstrative embodiments, controller 124 may be configured to control, trigger and/or cause device 102 to classify the valid CRC result as the false-positive CRC result, for example, only when the count of unreliable data symbols is higher than the count threshold, for example, when the estimated noise condition indicates noise above the noise threshold, e.g., as described below.

In some demonstrative embodiments, controller 124 may be configured to control, trigger and/or cause device 102 to classify the valid CRC result as the false-positive CRC result, for example, only when the count of unreliable data symbols is equal to the count threshold, for example, when the estimated noise condition indicates noise below the noise threshold, e.g., as described below.

In some demonstrative embodiments, the count threshold may be 4. In other embodiments, the count threshold may include any other number.

In some demonstrative embodiments, controller 124 may be configured to control, trigger and/or cause device 102 to determine a plurality of reliability values corresponding to a plurality of data symbols of the received wireless communication packet, and to identify the one or more unreliable data symbols, for example, based on the plurality of reliability values, e.g., as described below.

In some demonstrative embodiments, controller 124 may be configured to control, trigger and/or cause device 102 to identify an unreliable data symbol, for example, based on a comparison between a reliability value corresponding to the data symbol and a reliability threshold, e.g., as described below.

In some demonstrative embodiments, controller 124 may be configured to control, trigger and/or cause device 102 to determine the reliability value corresponding to the data symbol, for example, based on an estimated detection error corresponding to the data symbol, e.g., as described below.

In some demonstrative embodiments, detection of the unreliable data symbols may be based, for example, on a modulation type, a packet coding structure for the packet, and/or a demodulator structure, e.g., as described below.

In one example, a distance between a received data symbol and an ideal signal constellation point may be used as a metric, for example, to determine whether a received data symbol may be reliable or not, for example, for memoryless modulations, for example, Quadrature Phase-Shift Keying (PSK) (QPSK) and/or Quadrature Amplitude Modulation (QAM), e.g., as described below.

In another example, a distance between a differential phase of a received data symbol and ideal signal phase points may be used as a metric, for example, to determine whether a received data symbol may be reliable or not, for example, for differential modulations, e.g., Differential QPSK (DQPSK) or Differential 8-Phase Shift Keying (D8PSK).

In another example, a Viterbi trellis structure receiver may be a common architect, for example, for modulations with memory, e.g., Gaussian Frequency Shift Keying (GFSK) or some other coding structures. For example, using a soft output Viterbi reaching algorithm, detection of the unreliable data symbols may be straightforward. However, a hard-decision output Viterbi algorithm may be widely used, for example, due to its simplicity, e.g., compared to the soft output Viterbi reaching algorithm.

In some demonstrative embodiments, device 102 may be configured to detect and/or to determine the count of unreliable data symbols in a hard decision Viterbi demodulator implementation, e.g., as described below.

In some demonstrative embodiments, controller 124 may be configured to control, trigger and/or cause device 102 to determine the estimated detection error corresponding to the data symbol, for example, based on a plurality of state metrics of a Viterbi decoding to decode the data symbol, e.g., as described below.

In some demonstrative embodiments, controller 124 may be configured to control, trigger and/or cause device 102 to determine a likelihood ratio corresponding to the data symbol, for example, based on the plurality of state metrics; and to determine the estimated detection error corresponding to the data symbol, for example, based on the likelihood ratio and a detected value of the data symbol according to the Viterbi decoding, e.g., as described below.

In some demonstrative embodiments, controller 124 may be configured to control, trigger and/or cause device 102 to determine the likelihood ratio corresponding to the data symbol based on a difference between a first metric value and a second metric value, e.g., as described below.

In some demonstrative embodiments, the first metric value may include a minimal state metric of a first plurality of state metrics corresponding to a first data symbol value, and/or the second metric value may include a minimal state metric of a second plurality of state metrics corresponding to a second data symbol value, e.g., as described below.

In some demonstrative embodiments, device 102 may be configured to detect an unreliable data symbol, for example, based on a conventional hard-decision output Viterbi demodulator, e.g., as described below.

In one example, the hard-decision output Viterbi demodulator may use 2GFSK modulation, which may be a major modulation mode for a Bluetooth system.

In some demonstrative embodiments, a 2GFSK modulation receiver may be modeled with a 4-states Viterbi trellis searching algorithm, e.g., as descried below Reference is made to FIG. 4, which schematically illustrate transitions 400 of a 4-states Viterbi trellis searching algorithm, which may be implemented in accordance with some demonstrative embodiments.

Figure 4:
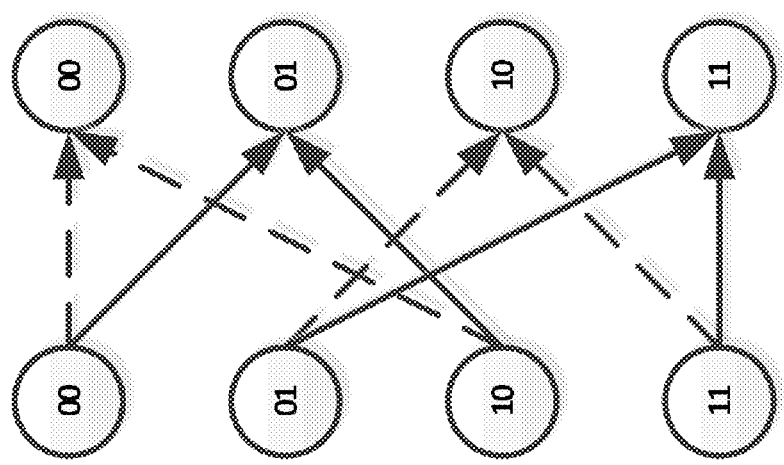
FIG. 4 is a schematic illustration of transitions of a 4-states Viterbi trellis searching algorithm, in accordance with some demonstrative embodiments.

As shown in FIG. 4, a dotted line denotes a transition caused by data "0", and a solid line denotes a transition caused by data "1".

As shown in FIG. 4, from each state, there may be two branches, e.g., the dotted line corresponding to the data "0" and the solid line corresponding to the data As shown in FIG. 4, each state has two braches coming in, e.g., the dotted line corresponding to the data "0" and the solid line corresponding to the data "1". For example, the corresponding data, e.g., "0" or "1", may be the Least Significant Bit (LSB) of the state, for example, transition to states 00 and 10 may be caused by the data "0", and/or transition to states 01 and 11 may be caused by the data "1".

In some demonstrative embodiments, a likelihood ratio, denoted llr(t), may be determined, for example, based on state metrics of the states, e.g., as described below, For example, the state metric at a time t of state 00, 01, 10 and 11, may be denoted as "sm00(t), sm01(t), sm10(t) and sm11(t)" respectively. For example, the metrics sm00(t) and sm10(t) may include information on how likely the received data is 0; and sm01(t) and sm11(t) may include information on how likely the received data is 1.

In some demonstrative embodiments, the likelihood ratio llr(t) may be determined, e.g., as follows:

$llr(t) = \min\{sm00(t), sm10(t)\} - \min\{sm01(t), sm11(t)\}$

In some demonstrative embodiments, the higher the channel Signal to Noise Ratio (SNR), an average |llr(t)| may be higher, e.g., it may be easier to distinguish between data "0" and "1". Therefore, the likelihood ratio llr(t) may provide a reliable measurement of the received data at the time t.

In some demonstrative embodiments, clipping the likelihood ratio llr(t) within a range $\{-llr\_max, llr\_max\}$, wherein llr_max denotes a maximum value of llr(t), and shifting a clipped result up by llr_max, may allow to obtain the likelihood ratio llr(t) in a range $\{0, 2*llr\_max\}$. Therefore, when a received data symbol is more like 0, the likelihood ratio llr may be close to 0; otherwise, the likelihood ratio llr may be close to 2*llr_max.

In some demonstrative embodiments, the likelihood ratio llr(t) may provide an instant measurement on a received data symbol, e.g., instantly after receiving it. However, a final decision on the received data symbol may be made after a certain symbol delay, e.g., due to a trace back mechanism of the Viterbi algorithm.

In some demonstrative embodiments, a soft error of the received data symbol may be determined, e.g., as follows:

$$error = \begin{cases} llr(t) & \text{if } d(t) = 0 \\ 2*llr\_max - llr(t) & \text{if } d(t) = 1 \end{cases} \quad (7)$$

wherein d(t) (0 or 1) denotes a final decision on the received data.

In some demonstrative embodiments, when the error of the received data symbol is higher than a threshold, denoted "LLR_TH", the received data symbol may be considered as an unreliable received data symbol.

Figure 5:
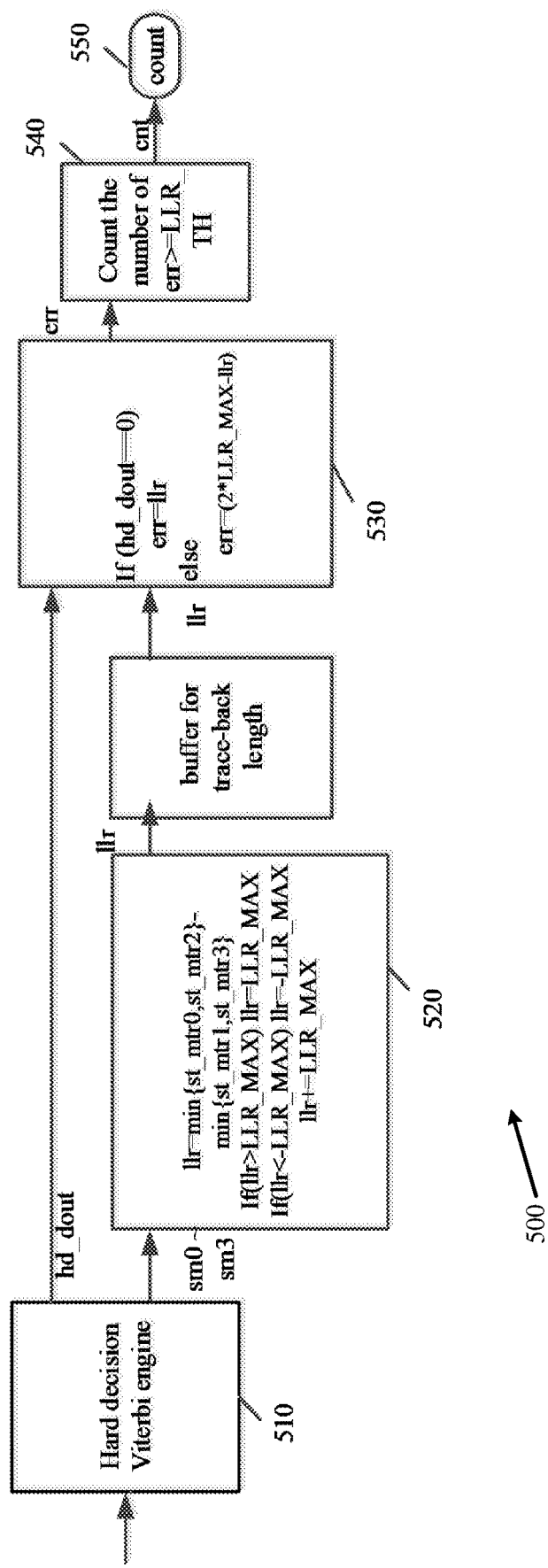
FIG. 5 is a schematic block diagram illustration of a false-positive detector, in accordance with some demonstrative embodiments.

Reference is made to FIG. 5, which schematically illustrates a block diagram of a false-positive detector 500, in accordance with some demonstrative embodiments.

In one example, controller 124 (FIG. 1) may be configured to perform a role of, and/or one or more operations and/or functionalities of, false-positive detector 500.

In some demonstrative embodiments, as shown in FIG. 5, false-positive detector 500 may include a hard-decision Viterbi demodulator 510, e.g., a conventional hard-decision Viterbi demodulator.

In some demonstrative embodiments, as shown in FIG. 5, false-positive detector 500 may include a likelihood ratio estimator 520, for example, to estimate the likelihood ratio llr(t).

In some demonstrative embodiments, as shown in FIG. 5, false-positive detector 500 may include a reliability detector 530, for example, to detect unreliable data symbols in a received wireless communication packet.

In some demonstrative embodiments, as shown in FIG. 5, false-positive detector 500 may include a counter 540, for example, to count a number of the unreliable data symbols in the received wireless communication packet.

In some demonstrative embodiments, false-positive detector 500 may output a report 550 including a total count of the unreliable data symbols, for example, when processing of the received wireless communication packet is complete.

In some demonstrative embodiments, controller 124 (FIG. 1) may control, trigger and/or cause device 102 (FIG. 1) to determine whether the received wireless communication packet having a valid CRC result is to be classified as a packet having false-positive CRC result, for example, based on report 550 including the total count of the unreliable data symbols.

The following Table 1 includes simulation results, for example, when using false-positive detector 500, for example, using a maximum payload length of 30 bytes for 1-slot case, 187 bytes for 3-slots case, and/or 343 bytes for 5-slots case, e.g., in accordance with Bluetooth Basic Rate (BR) mode, e.g., in accordance with the classic BT standard:

TABLE 1

| | | SNR (dB) | | | | | | |
|---|---|---|---|---|---|---|---|---|
| | | 9 | 10 | 11 | 12 | 13 | 14 | 15 |
| 5-slot | BER | 0.01793 | 0.007175 | 0.002661 | 0.000956 | 0.000162 | 0.000019 | 0.000003 |
| | nAvW | 0.0936 | 0.0379 | 0.0176 | 0.0060 | 0.0016 | 0.0003267 | 4.6882e−05 |
| | AvW | 256.758331 | 103.990616 | 48.219681 | 16.553282 | 4.482003 | 0.897084 | 0.128645 |
| | AvW0 | x | x | 42.666668 | 12.472727 | 3.917197 | 0.860915 | 0.123924 |
| | AvW4 | x | x | 39.0 | 20.444445 | 11.588235 | x | x |
| | AvW6 | 280.100006 | 110.931038 | 54.236843 | 37.666668 | x | x | x |
| | max W0 | x | x | 66 | 44 | 16 | 6 | 3 |
| | min W4 | x | x | 17 | 5 | 3 | x | x |
| | min W6 | 98 | 39 | 17 | 8 | x | x | x |
| | wTH | | | | 12 | | | |
| | MisR | x | x | 1 | 0.454545 | 0.036093 | 0 | 0 |
| | CR4 | x | x | 1 | 0.80 | 0.411765 | x | x |
| | CR6 | 1 | 1 | 1 | 0.944444 | x | x | x |
| 3-slot | nAvW | 0.0839 | 0.0437 | 0.0168 | 0.0060 | 0.0018 | 0.00038644 | 5.1275e−05 |
| | AvW | 125.555557 | 65.346291 | 25.126528 | 8.922145 | 2.710947 | 0.578110 | 0.076707 |
| | AvW0 | x | x | 20.323530 | 7.315603 | 2.425054 | 0.529243 | 0.072437 |
| | AvW4 | x | 50.2500 | 26.475000 | 11.25 | 11.6250 | x | x |
| | AvW6 | 125.555557 | 75.034485 | 30.333334 | 17.571428 | 12.0 | x | x |
| | max W0 | x | x | 53 | 37 | 24 | 8 | 3 |
| | min W4 | x | 35 | 11 | 1 | 4 | x | x |
| | min W6 | 50 | 22 | 11 | 6 | 12 | x | x |
| | wTH | | | | 10 | | | |

TABLE 1-continued

| | | SNR (dB) | | | | | | |
|---|---|---|---|---|---|---|---|---|
| | | 9 | 10 | 11 | 12 | 13 | 14 | 15 |
| | MisR | x | x | 0.882353 | 0.234043 | 0.016060 | 0 | 0 |
| | CR4 | x | 1 | 1 | 0.625 | 0.3750 | x | x |
| | CR6 | 1 | 1 | 1 | 0.785714 | 1 | x | x |
| 1-slot | nAvW | 0.0781 | 0.0399 | 0.0180 | 0.0071 | 0.0019 | 0.00038754 | 5.9379e−05 |
| | AvW | 18.746033 | 9.567993 | 4.331310 | 1.708858 | 0.451395 | 0.093009 | 0.014251 |
| | AvW0 | 13.592592 | 7.147887 | 3.664975 | 1.444740 | 0.413186 | 0.089842 | 0.014256 |
| | AvW4 | 20.080 | 12.625 | 7.782609 | 5.05 | 6.80 | x | x |
| | AvW6 | 29.481482 | 22.714285 | 13.5000 | 46.799999 | 9.0 | x | x |
| | max W0 | 33 | 39 | 26 | 13 | 8 | 6 | 2 |
| | min W4 | 9 | 0 | 0 | 1 | 2 | x | x |
| | min W6 | 13 | 9 | 4 | 8 | 4 | x | x |
| | wTH | | | | 8 | | | |
| | MisR | 0.777778 | 0.387324 | 0.116751 | 0.008877 | 0.000306 | 0 | 0 |
| | CR4 | 1 | 0.78125 | 0.478261 | 0.2 | 0.40 | x | x |
| | CR6 | 1 | 1 | 0.666667 | 1 | 0.5 | x | x | wherein the variables in Table 1 may be defined, e.g., as follows:

AvW=(sum of cnt)/(no of received packets)

nAvW=AvW/(payload_length_byte *8)

AvW_0=(sum of cnt of packets with none error)/(no of received packets with none error)

AvW_4=(sum of cnt of packets with 4 errors)/(no of received packets with 4 errors)

AvW_6=(sum of cnt of packets with 6 or more errors)/(no of received packets with 6 or more errors)

maxW_0: maximum cnt value of error-free packets minW_4: minimum cnt value of received packets with 4 errors minW_6: minimum cnt value of received packets with 6 or more errors wTH: threshold used to reject the received packet MisR: the probability of cnt of an error-free packet meets wTH CR4: the probability of cnt of a 4 errors packet meets wTH CR6: the probability of cnt of a 6 or more errors packet meets wTH X: the event not happen during the simulation.

In some demonstrative embodiments, as shown in Table 1, packets with 6-errors or more than 6 errors may be easily rejected, for example, based on the variable "wTH".

In some demonstrative embodiments, as shown in Table 1, packets with 4 errors may be rejected, for example, based on a trade-off between the variable "MisR" and the variable "CR4".

In some demonstrative embodiments, as shown in Table 1, the variable "nAvW" may provide a good indicator to a channel SNR condition, and may be insensitive to the payload length.

Referring back to FIG. 1, in some demonstrative embodiments, device 102 may be configured to detect and/or to determine the count of unreliable data symbols in a received packet, for example, when implemented in a Direct Sequence Spread Spectrum (DSSS) system, e.g., as described below.

In some demonstrative embodiments, controller 124 may be configured to control, trigger and/or cause device 102 to determine the estimated detection error corresponding to the data symbol, for example, based on a de-spreading correlation result corresponding to the data symbol according to a DSSS decoding, e.g., as described below.

In some demonstrative embodiments, controller 124 may be configured to control, trigger and/or cause device 102 to determine the estimated detection error corresponding to the data symbol, for example, based on a comparison between the de-spreading correlation result and a predefined correlation value corresponding to the data symbol, e.g., as described below.

In one example, device 102 may process a wireless communication packet having a 16-bit FCS, for example, when a PHY layer of device 102 employs Direct DSSS mechanism, for example, in accordance with the *IEEE 802.15.4 (2006) Standard*.

For example, DSSS systems may de-spread received symbols at the receiver. The de-spreading may use hard-decisions or soft-decisions on the received symbols, for example, via a correlation with each of the possible received spread spectrum codewords, for example, sixteen 32-chip codewords, e.g., in accordance with the *IEEE 802.15.4 (2006) Standard*.

For example, when using DSSS, a correlator having a largest correlation sum may be deemed to be the transmitted symbol, e.g. prior to being spread at the transmitter. For example, the correlator corresponding to the transmitted symbol may have a maximum possible correlation sum, where every received chip matched the reference codeword used for that correlator, e.g., in a noise and interference free environment. For example, when there may be a burst of interference or channel perturbations, which may be very common in the 2.4 GHZ band including interferers such as Bluetooth and WiFi, the correlation sum may be lower than the maximum possible correlation sum.

In some demonstrative embodiments, a reliability indicator may be determined based on a difference between the actual correlation sum and an ideal correlation sum, e.g., the maximum possible correlation sum.

In some demonstrative embodiments, the reliability indicator may be computed on a symbol-by-symbol basis. A total count of the unreliable data symbols may be used as a metric to decide, for example, if the received wireless communication packet having a valid CRC result is to be classified as having a false-positive result, and should be rejected for a new retransmission.

In some demonstrative embodiments, it may be inferred that a burst of interference occurred for some portion of the frame, for example, by comparing the reliability indicator for all the symbols in the wireless communication packet.

In some demonstrative embodiments, using the count of the unreliable data symbols may provide an accurate metric with respect to a reliability of the received wireless communication packet. For example, when the count of the unreliable data symbols is over the count threshold, the wireless communication packet should be retransmitted, e.g., even though the CRC result is valid. This mechanism significantly improves the number of false-positive CRCs.

In some demonstrative embodiments, the mechanism of detecting the false-positive CRC results may be selectively disabled, for example, when channel SNR reaches the noise threshold and/or based on any other criteria, e.g., as described above In some demonstrative embodiments, a normalized average unreliable data symbol count may provide a good indicator on channel SNR condition. The normalized average unreliable data symbol count may be insensitive to a payload length.

In some demonstrative embodiments, using the count of the unreliable data symbols may provide one or more benefits and/or advantages, e.g., as describe below.

In some demonstrative embodiments, when using the count of the unreliable data symbols, a number of the unreliable data symbols may be counted, for example, even without the need of position information, which may simplify an implementation complexity.

In some demonstrative embodiments, the count of the unreliable data symbols may reflect a channel condition of the wireless communication channel, which may enable a receiver, e.g., device 102, to choose a suitable modulation scheme, e.g., to maximize a system throughput. For example, a data rate improvement algorithm, e.g., a Channel Quality Driven Data Rate (CQDDR) BT algorithm, may use the count of the unreliable data symbols, e.g., from the PHY, as a channel quality indication.

In some demonstrative embodiments, the count of the unreliable data symbols may indicate to the receiver, e.g., device 102, for example, when a CRC false positive protection mechanism can be stopped, which may avoid a penalty of this scheme for high signal-to-noise ratio (SNR) cases. For example, disabling this scheme of discarding 'suspect' BT packets under high SNR conditions may prevent false alarms from dominating a Packet Error Rate (PER).

In some demonstrative embodiments, the count of the unreliable data symbols may be based on the hard-decision Viterbi algorithm, e.g., hard-decision Viterbi demodulator 510 (FIG. 5). For example, initial likelihood information, e.g., from likelihood estimator 510 (FIG. 5), may be detected from the state metrics of the Viterbi engine, e.g., hard-decision Viterbi demodulator 510 (FIG. 5), and may be corrected with the hard decision output. Implementing false-positive detector 500 (FIG. 5) may avoid a complexity of conventional Soft Output Viterbi Algorithm (SOVA).

In some demonstrative embodiments, identifying an unreliable data symbol, for example, based on a likelihood ratio corresponding to the data symbol, e.g., when using the hard-decision Viterbi engine and/or the "DSSS reliability indicator", may be more accurate and reliable, e.g., compared to some amplitude and phase variance techniques.

In some demonstrative embodiments, device 102 may use the unreliable data symbols count, e.g., in a simple manner, for example, to improve the false-negative rate of CRC.

In some demonstrative embodiments, device 102 may provide a channel SNR estimation, for example, based on the unreliable data symbols count, which may be used for system link quality control, e.g., as described above.

Figure 6:
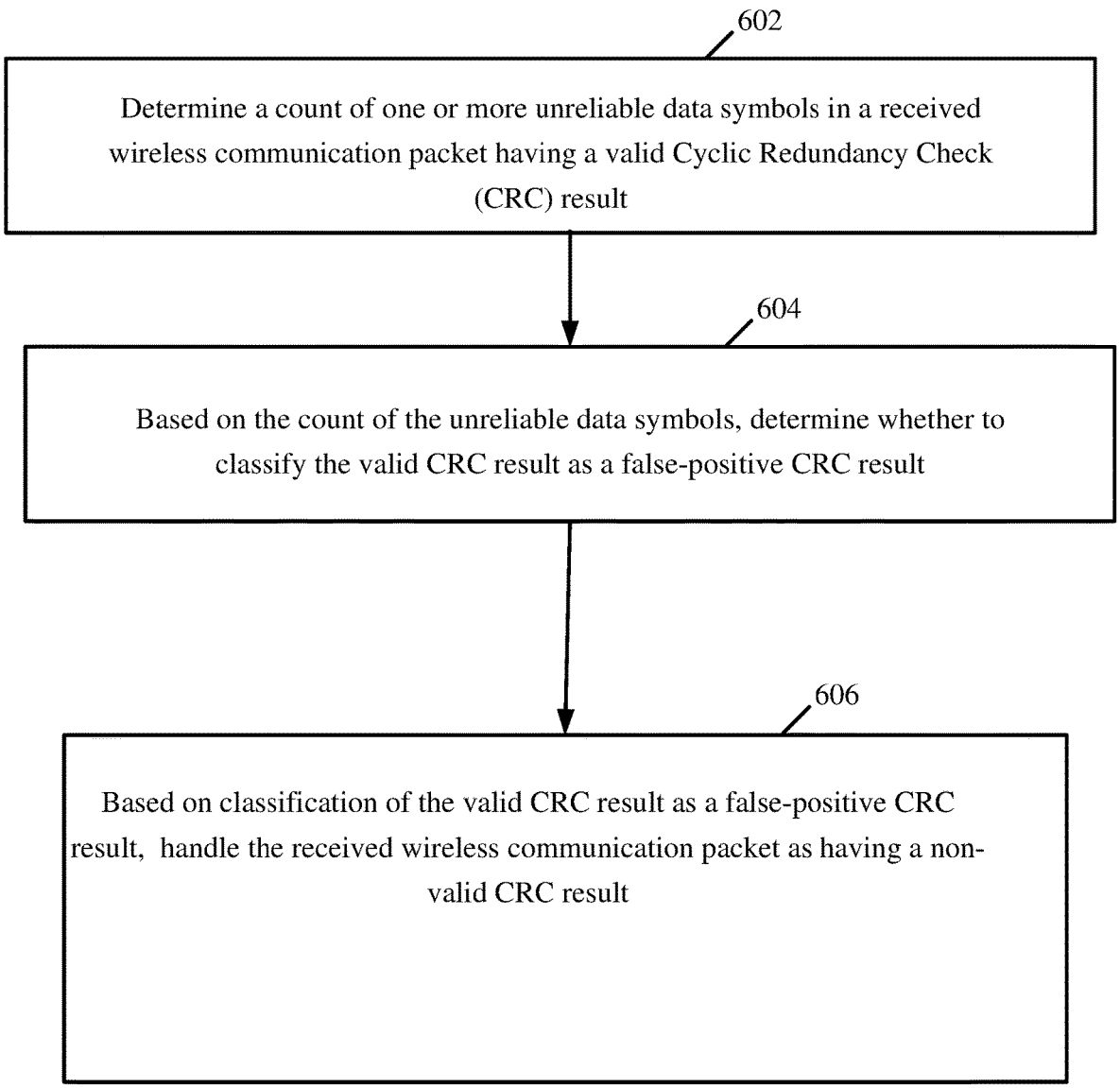
FIG. 6 is a schematic flow-chart illustration of a method of processing a wireless communication packet based on a Cyclic Redundancy Check (CRC) result, in accordance with some demonstrative embodiments.

Reference is made to FIG. 6, which schematically illustrates a method of processing a wireless communication packet based on a CRC result, in accordance with some demonstrative embodiments. For example, one or more operations of the method of FIG. 6 may be performed by one or more elements of a system, e.g., system 100 (FIG. 1), for example, one or more wireless devices, e.g., device 102 (FIG. 1), a controller, e.g., controller 124 (FIG. 1), a radio, e.g., radio 114 (FIG. 1), a receiver, e.g., receiver 116 (FIG. 1), and/or a message processor, e.g., message processor 128 (FIG. 1).

As indicated at block 602, the method may include determining a count of one or more unreliable data symbols in a received wireless communication packet having a valid CRC result. For example, controller 124 (FIG. 1) may be configured to control, trigger, and/or cause device 102 (FIG. 1) to determine a count of the one or more unreliable data symbols in the received wireless communication packet having the valid CRC result, e.g., as described above.

As indicated at block 604, the method may include, based on the count of the unreliable data symbols, determining whether to classify the valid CRC result as a false-positive CRC result. For example, controller 124 (FIG. 1) may be configured to control, trigger, and/or cause device 102 (FIG. 1) to, based on the count of the unreliable data symbols, determine whether to classify the valid CRC result as the false-positive CRC result, e.g., as described above.

As indicated at block 606, the method may include, based on classification of the valid CRC result as a false-positive CRC result, handle the received wireless communication packet as having a non-valid CRC result. For example, controller 124 (FIG. 1) may be configured to control, trigger, and/or cause device 102 (FIG. 1) to, based on the classification of the valid CRC result as the false-positive CRC result, handle the received wireless communication packet as having the non-valid CRC result, e.g., as described above.

Figure 7:
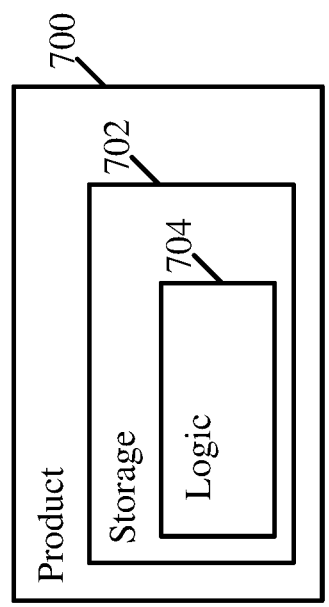
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), radio 114 (FIG. 1), receiver 116 (FIG. 1), transmitter 118 (FIG. 1), controller 124 (FIG. 1), and/or message processor 128 (FIG. 1), to cause device 102 (FIG. 1), radio 114 (FIG. 1), receiver 116 (FIG. 1), transmitter 118 (FIG. 1), controller 124 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication device to determine a count of one or more unreliable data symbols in a received wireless communication packet having a valid Cyclic Redundancy Check (CRC) result; based on the count of the unreliable data symbols, determine whether to classify the valid CRC result as a false-positive CRC result; and based on classification of the valid CRC result as a false-positive CRC result, handle the received wireless communication packet as having a non-valid CRC result.

Example 2 includes the subject matter of Example 1, and optionally, wherein the apparatus is configured to cause the wireless communication device to determine whether to classify the valid CRC result as the false-positive CRC result based on an estimated noise condition of a wireless communication channel for receiving the received wireless communication packet.

Example 3 includes the subject matter of Example 2, and optionally, wherein the apparatus is configured to cause the wireless communication device to determine whether to classify the valid CRC result as the false-positive CRC result based on a comparison between the count of unreliable data symbols and a count threshold, and based on a comparison between the estimated noise condition and a noise threshold.

Example 4 includes the subject matter of Example 3, and optionally, wherein the apparatus is configured to cause the wireless communication device to, when the estimated noise condition indicates noise above the noise threshold, classify the valid CRC result as the false-positive CRC result only when the count of unreliable data symbols is higher than the count threshold.

Example 5 includes the subject matter of Example 3 or 4, and optionally, wherein the apparatus is configured to cause the wireless communication device to, when the estimated noise condition indicates noise below the noise threshold, classify the valid CRC result as the false-positive CRC result only when the count of unreliable data symbols is equal to the count threshold.

Example 6 includes the subject matter of any one of Examples 3-5, wherein the count threshold is 4.

Example 7 includes the subject matter of any one of Examples 2-6, and optionally, wherein the apparatus is configured to cause the wireless communication device to determine the estimated noise condition based on a plurality of unreliable count values corresponding to a respective plurality of received wireless communication packets.

Example 8 includes the subject matter of any one of Examples 1-7, and optionally, wherein the apparatus is configured to cause the wireless communication device to determine a plurality of reliability values corresponding to a plurality of data symbols of the received wireless communication packet, and to identify the one or more unreliable data symbols based on the plurality of reliability values.

Example 9 includes the subject matter of Example 8, and optionally, wherein the apparatus is configured to cause the wireless communication device to determine a reliability value corresponding to a data symbol based on an estimated detection error corresponding to the data symbol.

Example 10 includes the subject matter of Example 9, and optionally, wherein the apparatus is configured to cause the wireless communication device to determine the estimated detection error corresponding to the data symbol based on a plurality of state metrics of a Viterbi decoding to decode the data symbol.

Example 11 includes the subject matter of Example 10, and optionally, wherein the apparatus is configured to cause the wireless communication device to determine a likelihood ratio corresponding to the data symbol based on the plurality of state metrics, and to determine the estimated detection error corresponding to the data symbol based on the likelihood ratio and a detected value of the data symbol according to the Viterbi decoding.

Example 12 includes the subject matter of Example 11, and optionally, wherein the apparatus is configured to cause the wireless communication device to determine the likelihood ratio corresponding to the data symbol based on a difference between a first metric value and a second metric value, the first metric value comprising a minimal state metric of a first plurality of state metrics corresponding to a first data symbol value, the second metric value comprising a minimal state metric of a second plurality of state metrics corresponding to a second data symbol value.

Example 13 includes the subject matter of Example 9, and optionally, wherein the apparatus is configured to cause the wireless communication device to determine the estimated detection error corresponding to the data symbol based on a de-spreading correlation result corresponding to the data symbol according to a Direct-sequence spread-spectrum (DSSS) decoding.

Example 14 includes the subject matter of Example 13, and optionally, wherein the apparatus is configured to cause the wireless communication device to determine the estimated detection error corresponding to the data symbol based on a comparison between the de-spreading correlation result and a predefined correlation value corresponding to the data symbol.

Example 15 includes the subject matter of any one of Examples 8-14, and optionally, wherein the apparatus is configured to cause the wireless communication device to identify an unreliable data symbol based on a comparison between a reliability value corresponding to the data symbol and a reliability threshold.

Example 16 includes the subject matter of any one of Examples 1-15, and optionally, wherein the apparatus is configured to cause the wireless communication device to, based on the classification of the valid CRC result as a false-positive CRC result, transmit a Negative Acknowledgement (NACK) to indicate to a transmitter of the received wireless communication packet that the received wireless communication packet is not successfully received.

Example 17 includes the subject matter of any one of Examples 1-16 and optionally, wherein the apparatus is configured to cause the wireless communication device to, based on the classification of the valid CRC result as a false-positive CRC result, discard the received wireless communication packet.

Example 18 includes the subject matter of any one of Examples 1-17, wherein the valid CRC result is based on a 16-bit CRC code.

Example 19 includes the subject matter of any one of Examples 1-18, wherein the received wireless communication packet comprises a Bluetooth (BT) packet.

Example 20 includes the subject matter of any one of Examples 1-18, wherein the received wireless communication packet comprises a Low-Rate Wireless Personal Area Networks (LR-WPAN) packet.

Example 21 includes the subject matter of any one of Examples 1-20, and optionally, comprising a radio to process the received wireless communication packet.

Example 22 includes the subject matter of Example 21, and optionally, comprising one or more antennas connected to the radio, a memory to store data processed by the wireless communication device, and a processor to execute instructions of an operating system.

Example 23 comprises an apparatus comprising means for executing any of the described operations of Examples 1-22.

Example 24 comprises a machine readable medium that stores instructions for execution by a processor to perform any of the described operations of Examples 1-22.

Example 25 comprises an apparatus comprising: a memory interface; and processing circuitry configured to: perform any of the described operations of Examples 1-22.

Example 26 comprises a method to perform any of the described operations of Examples 1-22.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:
   determine a count of one or more unreliable data symbols in a received wireless communication packet having a valid Cyclic Redundancy Check (CRC) result;
   determine whether to classify the valid CRC result as a false-positive CRC result, based on a comparison between the count of unreliable data symbols and a count threshold, and based on a comparison between an estimated noise condition of a wireless communication channel for receiving the received wireless communication packet and a noise threshold; and
   based on classification of the valid CRC result as the false-positive CRC result, handle the received wireless communication packet as having a non-valid CRC result.

2. The apparatus of claim 1 configured to cause the wireless communication device to, when the estimated noise condition indicates noise above the noise threshold, classify the valid CRC result as the false-positive CRC result only when the count of unreliable data symbols is higher than the count threshold.

3. The apparatus of claim 1 configured to cause the wireless communication device to, when the estimated noise condition indicates noise below the noise threshold, classify the valid CRC result as the false-positive CRC result only when the count of unreliable data symbols is equal to the count threshold.

4. The apparatus of claim 1, wherein the count threshold is 4.

5. The apparatus of claim 1 configured to cause the wireless communication device to determine the estimated noise condition based on a plurality of unreliable count values corresponding to a respective plurality of received wireless communication packets.

6. The apparatus of claim 1 configured to cause the wireless communication device to determine a plurality of reliability values corresponding to a plurality of data symbols of the received wireless communication packet, and to identify the one or more unreliable data symbols based on the plurality of reliability values.

7. The apparatus of claim 6 configured to cause the wireless communication device to determine a reliability value corresponding to a data symbol based on an estimated detection error corresponding to the data symbol.

8. The apparatus of claim 7 configured to cause the wireless communication device to determine the estimated detection error corresponding to the data symbol based on a plurality of state metrics of a Viterbi decoding to decode the data symbol.

9. The apparatus of claim 8 configured to cause the wireless communication device to determine a likelihood ratio corresponding to the data symbol based on the plurality of state metrics, and to determine the estimated detection error corresponding to the data symbol based on the likelihood ratio and a detected value of the data symbol according to the Viterbi decoding.

10. The apparatus of claim 9 configured to cause the wireless communication device to determine the likelihood ratio corresponding to the data symbol based on a difference between a first metric value and a second metric value, the first metric value comprising a minimal state metric of a first plurality of state metrics corresponding to a first data symbol value, the second metric value comprising a minimal state metric of a second plurality of state metrics corresponding to a second data symbol value.

11. The apparatus of claim 7 configured to cause the wireless communication device to determine the estimated detection error corresponding to the data symbol based on a de-spreading correlation result corresponding to the data symbol according to a Direct-sequence spread-spectrum (DSSS) decoding.

12. The apparatus of claim 6 configured to cause the wireless communication device to identify an unreliable data symbol based on a comparison between a reliability value corresponding to the data symbol and a reliability threshold.

13. The apparatus of claim 1 configured to cause the wireless communication device to, based on the classification of the valid CRC result as the false-positive CRC result, transmit a Negative Acknowledgement (NACK) to indicate to a transmitter of the received wireless communication packet that the received wireless communication packet is not successfully received.

14. The apparatus of claim 1 configured to cause the wireless communication device to, based on the classification of the valid CRC result as the false-positive CRC result, discard the received wireless communication packet.

15. The apparatus of claim 1, wherein the valid CRC result is based on a 16-bit CRC code.

16. The apparatus of claim 1, wherein the received wireless communication packet comprises a Bluetooth (BT) packet.

17. The apparatus of claim 1, wherein the received wireless communication packet comprises a Low-Rate Wireless Personal Area Networks (LR-WPAN) packet.

18. The apparatus of claim 1 comprising a radio to process the received wireless communication packet, one or more antennas connected to the radio, a memory to store data processed by the wireless communication device, and a processor to execute instructions of an operating system.

19. A product comprising one or more tangible computer-readable non-transitory storage media comprising computer-executable instructions operable to, when executed by at least one processor, enable the at least one processor to cause a wireless communication device to:
determine a count of one or more unreliable data symbols in a received wireless communication packet having a valid Cyclic Redundancy Check (CRC) result;
determine whether to classify the valid CRC result as a false-positive CRC result, based on a comparison between the count of unreliable data symbols and a count threshold, and based on a comparison between an estimated noise condition of a wireless communication channel for receiving the received wireless communication packet and a noise threshold; and
based on classification of the valid CRC result as the false-positive CRC result, handle the received wireless communication packet as having a non-valid CRC result.

20. The product of claim 19, wherein the instructions, when executed, cause the wireless communication device to determine a plurality of reliability values corresponding to a plurality of data symbols of the received wireless communication packet, and to identify the one or more unreliable data symbols based on the plurality of reliability values.

21. The product of claim 19, wherein the instructions, when executed, cause the wireless communication device to, based on the classification of the valid CRC result as the false-positive CRC result, transmit a Negative Acknowledgement (NACK) to indicate to a transmitter of the received wireless communication packet that the received wireless communication packet is not successfully received.

22. An apparatus of a wireless communication device, the apparatus comprising:
means for determining a count of one or more unreliable data symbols in a received wireless communication packet having a valid Cyclic Redundancy Check (CRC) result;
means for, determining whether to classify the valid CRC result as a false-positive CRC result, based on a comparison between the count of unreliable data symbols and a count threshold, and based on a comparison between an estimated noise condition of a wireless communication channel for receiving the received wireless communication packet and a noise threshold; and
means for, based on classification of the valid CRC result as the false-positive CRC result, causing the wireless communication device to handle the received wireless communication packet as having a non-valid CRC result.

23. The apparatus of claim 22 comprising means for, based on the classification of the valid CRC result as the false-positive CRC result, causing the wireless communication device to transmit a Negative Acknowledgement (NACK) to indicate to a transmitter of the received wireless communication packet that the received wireless communication packet is not successfully received.

* * * * *